United States Patent
Benson et al.

(10) Patent No.: US 10,948,067 B2
(45) Date of Patent: Mar. 16, 2021

(54) POLYMERIC GEAR

(71) Applicant: GM GLOBAL TECHNOLOGY OPERATIONS LLC, Detroit, MI (US)

(72) Inventors: Christopher G. Benson, Rochester Hills, MI (US); Arvo J. Siismets, Troy, MI (US); Nathan J. Hankins, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 219 days.

(21) Appl. No.: 16/108,160

(22) Filed: Aug. 22, 2018

(65) Prior Publication Data

US 2020/0063848 A1 Feb. 27, 2020

(51) Int. Cl.
| | |
|---|---|
| *F16H 55/14* | (2006.01) |
| *F16H 55/06* | (2006.01) |
| *F16H 1/06* | (2006.01) |
| *F16H 55/08* | (2006.01) |
| *F16H 55/16* | (2006.01) |

(52) U.S. Cl.
CPC ............. *F16H 55/06* (2013.01); *F16H 1/06* (2013.01); *F16H 55/08* (2013.01); *F16H 55/16* (2013.01); *F16H 2055/065* (2013.01)

(58) Field of Classification Search
CPC ... F16C 33/581; F16H 2025/065; F16H 55/06
See application file for complete search history.

(56) References Cited

U.S. PATENT DOCUMENTS

| | | | |
|---|---|---|---|
| 3,329,037 A | 7/1967 | Stott | |
| 10,550,893 B2 * | 2/2020 | Iino | .................. F16C 19/527 |
| 2014/0345405 A1 | 11/2014 | Radzevich | |
| 2018/0223982 A1 * | 8/2018 | Nakao | .................. F16H 55/48 |

* cited by examiner

*Primary Examiner* — Jake Cook

(57) ABSTRACT

A transmission includes an input drive shaft, a drive gear, an idler gear, and a driven gear. The drive gear is rotationally fixed to the input drive shaft which, in turn, may but not necessarily, be powered by an engine. The idler gear may include a second set of gear teeth mounted to a bearing wherein the second set of gear teeth are formed from polymeric material. The second set of gear teeth for the idler gear may be in meshing engagement with the first set of gear teeth. The driven gear may include a third set of gear teeth in meshing engagement with the second set of gear teeth. The driven gear may be rotationally fixed to a pump shaft for a transmission pump. The input drive shaft, the drive gear, the idler gear, and the driven gear are configured to power a transmission pump.

12 Claims, 6 Drawing Sheets

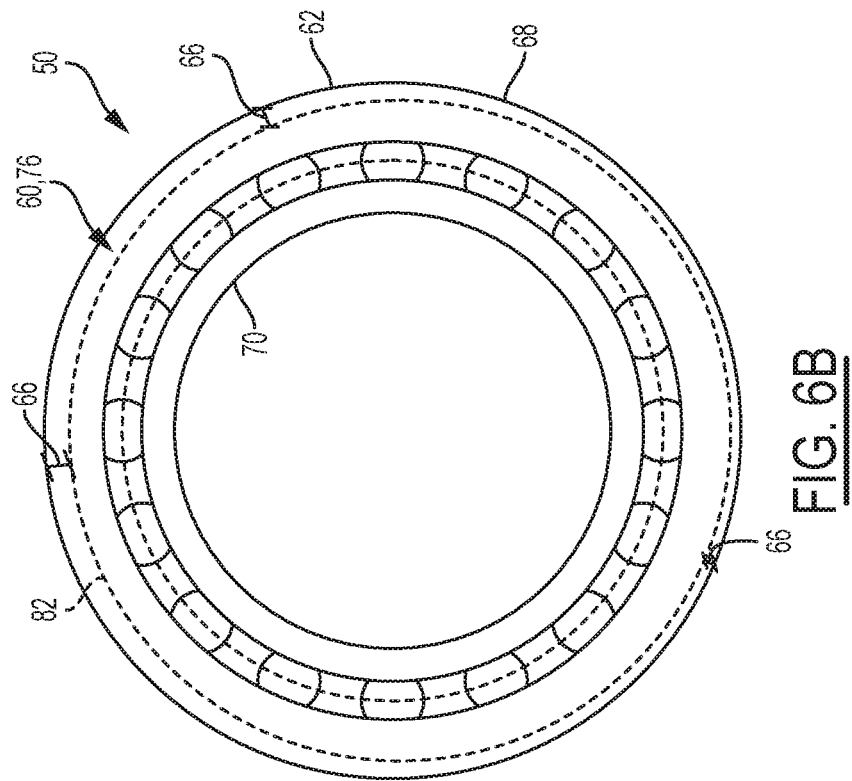
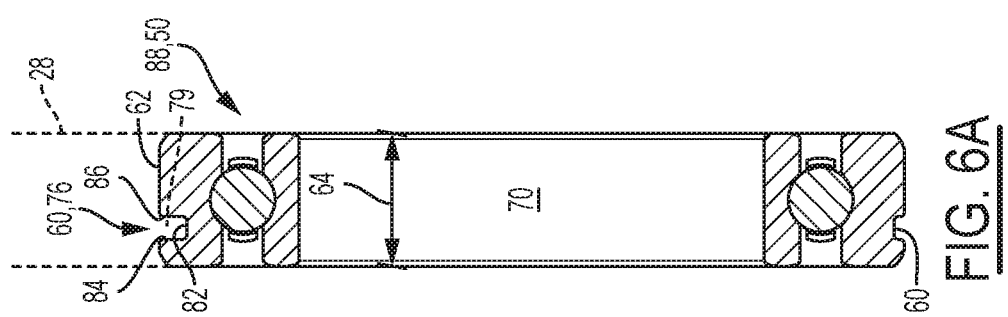

POLYMERIC GEAR

TECHNICAL FIELD

The present disclosure relates to the field of gear trains. More particularly, the disclosure relates to eliminating gear whine noise in a transmission gear train or the like.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. Transmission speed ratio is the ratio of input shaft speed to output shaft speed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Most transmissions are equipped with a torque converter. When the vehicle is stationary or moving very slowly, the gearbox input speed is less than the minimum operating speed of the engine. A launch device transmits torque from the engine to the gearbox input while permitting the engine to rotate at an acceptable speed. A torque converter includes an impeller driven by the engine and a turbine driving the gearbox input. Torque is transferred from the impeller to the turbine hydro-dynamically.

However, the intrusive noise known as gear whine may be caused by vibrations generated by gears in a gear train (such as in the example of a transmission or the like) as the gears mesh as a result of imperfections caused by design, loading, temperature effects, and manufacturing variations. Reducing gear whine noise to an acceptable level is a significant challenge, especially for complex gearboxes such as, but not limited to a planetary automatic transmission. Gear whine, by nature is a tonal noise, which may be objectionable to drivers and passengers because it cuts through other noises in the vehicle interior.

In light of manufacturing and assembly tolerances together with components which deflect under the loads applied in a setting such as in a transmission gear train, the gear transmission error may occur as gears rotate relative to each other. The gear transmission error generates a vibration at the gear mesh thereby generating unacceptable gear whine noise. Such vibrations at the gear mesh in a transmission for example may be transmitted through the internal gearbox components to the housing, where it is radiated directly as noise or transferred through the chassis in the form of vibrations to be radiated as noise elsewhere.

The cause of gear whine is two-fold: (1) the consistency of the engagement and disengagement of the intermeshing metal gear teeth; and (2) the natural frequency vibrations of the metal gear teeth circumferentially as a result of sequential engagement and disengagement of the intermeshing metal gear teeth. Transmission error of the gear and the pinion is a root cause for excessive noise excitation. Ideally, the gear and pinion are precisely manufactured such that the transmission error is minimized. However, this is not feasible due to manufacturing errors. Further, the gearing arrangement will experience additional performance issues due to static and dynamic displacement and misalignment of tooth flanks.

Accordingly, there is a need to eliminate gear whine noise generated within a gear train.

SUMMARY

The present disclosure provides a transmission which significantly reduces gear whine noise. The transmission includes an input drive shaft together with a gear train wherein the gear train includes a primary drive gear, an idler gear, and a driven gear for the transmission pump. The primary drive gear is fixed to the input shaft which, in turn, may be powered by an engine. The idler gear may include a second set of gear teeth mounted to a bearing wherein the second set of gear teeth are formed from a polymeric material. The bearing may be disposed on an idler shaft. The second set of polymeric gear teeth in the idler gear may be in meshing engagement with the first set of gear teeth. The driven gear may include a third set of gear teeth in meshing engagement with the second set of gear teeth. The transmission pump drive gear may be rotationally fixed to a pump shaft of a transmission pump. The input shaft, the primary drive gear, the idler gear, and the driven gear (for the pump) are configured to power at least a transmission pump.

In the example, non-limiting transmission, the aforementioned bearing may define a groove along an outer circumferential surface of the bearing, the groove being off-center relative to the width of the bearing. The groove may further define a groove depth which varies along a circumferential length of the groove. The aforementioned groove is configured to retain an inner circumference of the second set of polymeric gear teeth which are formed from a polymeric material. It is understood that the second set of polymeric gear teeth may, but not necessarily, be over-molded onto the bearing. The aforementioned gear train may be disposed within the transmission housing such that the input shaft and the idler shaft may, but not necessarily, each extend through a corresponding aperture in the housing.

In yet another embodiment of the present disclosure, a gear is provided which includes a bearing and a polymeric outer ring mounted on the bearing. The bearing may, but not necessarily, be a ball bearing. The bearing may further define a recess in an outer surface of the bearing. The outer ring may define an inner circumference surface and an outer circumference surface wherein the outer circumference surface further defines a plurality of polymeric gear teeth along the outer circumference surface. The recess in the bearing may be configured to retain the outer ring engaging with at least a portion of the inner circumference of the polymeric outer ring. The recess in the bearing may be configured in a variety of ways such as, but not limited to a continuous groove along a circumference of the outer surface of the bearing. The recess may, but not necessarily, be off-center relative to a width of the bearing. The continuous groove may, but not necessarily, also define a depth which varies along the circumference of the outer surface of the bearing. The recess in the form of a continuous groove may, but not necessarily, define a base surface, a first side wall, and a second side wall. However, in one of many possible alternatives, the recess may alternatively be configured as one of a plurality of recesses defined along a circumference of the outer surface of the bearing. Each recess in the plurality of recesses may be perpendicular to a front surface of the bearing.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

FIG. 6A is a cross-sectional view of a bearing which can be used in the polymeric gear of FIG. 5 and in FIG. 6B (along line A-A).

FIG. 6B is a front-view of the bearing in FIG. 6A.

Like reference numerals refer to like parts throughout the description of several views of the drawings.

DETAILED DESCRIPTION

Figure 1:
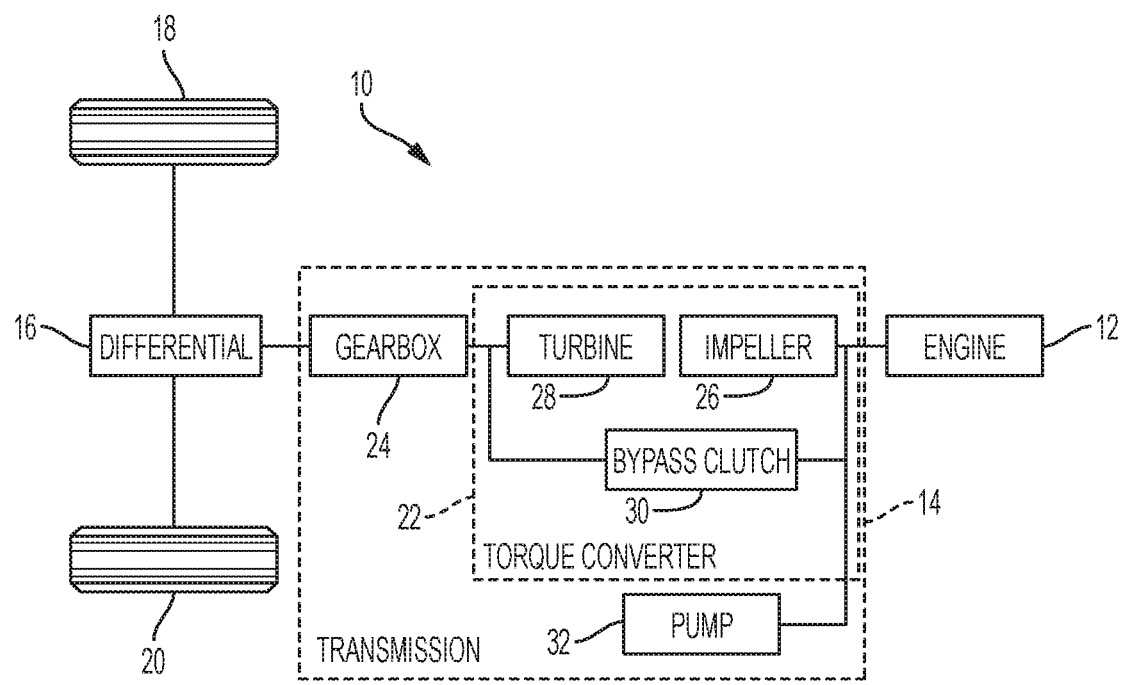
FIG. 1 is a schematic diagram of the vehicle powertrain.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, un-recited elements or method steps.

The phrase "consisting of" excludes any element, step, or ingredient not specified in the claim. When this phrase appears in a clause of the lifter body 14 of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

The terms "upper" and "lower" may be used with respect to regions of a single component and are intended to broadly indicate regions relative to each other wherein the "upper" region and "lower" region together form a single component. The terms should not be construed to solely refer to vertical distance/height.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

Embodiments of the present disclosure are described herein. It is to be understood, however, that the disclosed embodiments are merely examples and other embodiments can take various and alternative forms. The figures are not necessarily to scale, some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An exemplary vehicle powertrain 10 is illustrated schematically in FIG. 1. In FIG. 1, solid lines represent mechanical connections such as shafts or fixed ratio gearing. The engine 12 generates mechanical power by burning fuel. The transmission 14 transmits the power to a differential 16 at a shaft speed suited to current vehicle needs, which may be faster or slower than the shaft speed at which engine 12 generates the power. The differential 16 reduces the shaft speed by a fixed final-drive ratio and transmits the power to the left and right driving wheels 18 and 20, allowing for slight speed differences between the wheels as the vehicle turns a corner.

The transmission 14 may include a torque converter 22 or other launch device and a gearbox 24. The torque converter 22 includes an impeller 26 that is fixed to the engine crankshaft and a turbine 28 that is fixed to the gearbox input shaft. Torque is transferred hydro-dynamically from the impeller 26 to the turbine 28 when the impeller 26 rotates faster than the turbine 28. A bypass clutch 30 may be engaged to transfer torque by friction from the impeller 26 to the turbine 28 to reduce the power loss inherent in the hydro-dynamic power transfer. The gearbox 24 includes a number of hydraulically-actuated shift elements. The gearbox 24 establishes different speed ratios by engaging various subsets of the shift elements. The transmission pump 32 provides pressurized fluid that engages the shift elements. Some of the power generated by engine 12 is used to drive the transmission pump 32, reducing the power delivered to the differential 16. In order to maximize the percentage of power delivered to the differential 16 and thus reduce the amount of fuel consumed by engine 12, it is desirable to minimize the power consumption of transmission pump 32.

Figure 2:
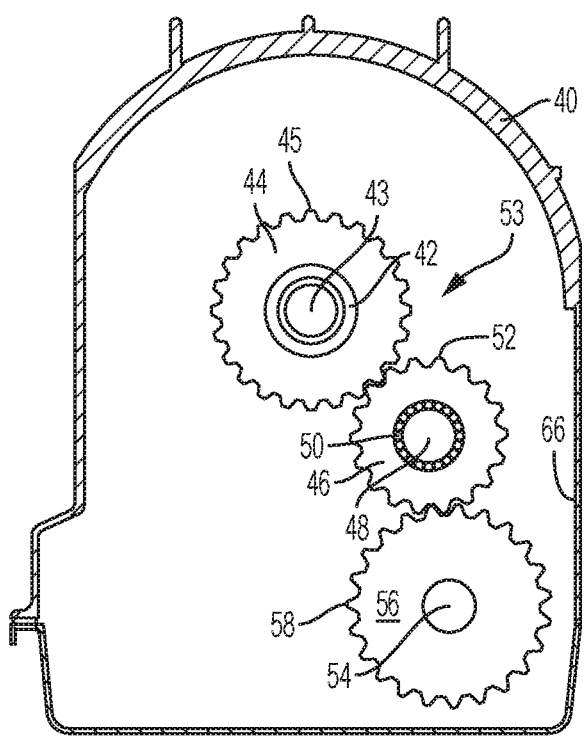
FIG. 2 is a partial, front view, in cross section, of the transmission of FIG. 1 along a cut line behind the torque converter wherein the transmission includes a pump drive gear and pump idler gear in the transmission together with a pump driven gear.
Figure 3:
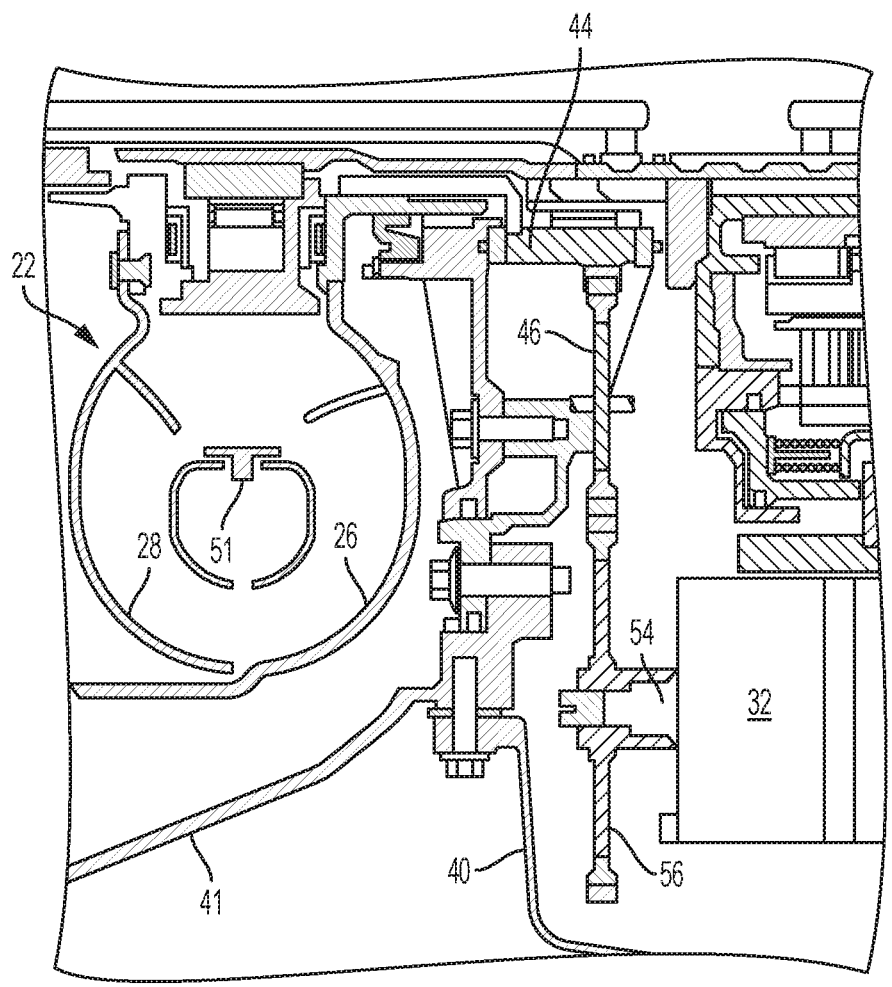
FIG. 3 is a cross sectional view of another portion of the transmission.
Figure 4:
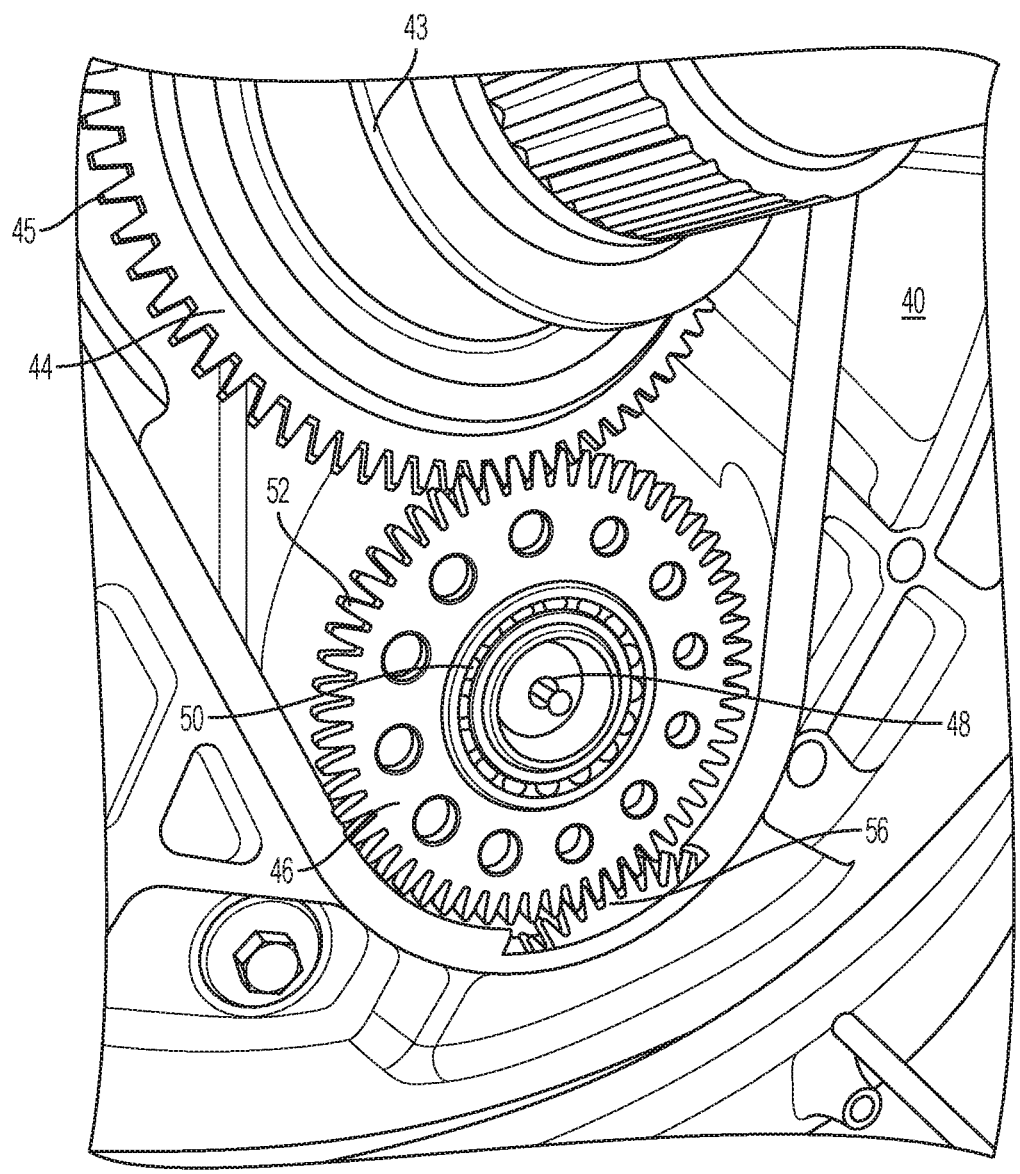
FIG. 4 is a partial perspective view of an example gear train having a polymeric (idler) gear on a front support for a transmission.

FIGS. 2 and 3 illustrate portions of the transmission 14. In FIGS. 3 and 4, the engine is to the left and the rear wheels are to the right. The transmission 14 includes a transmission housing (or case) 40 that may be one or more pieces assembled together. The torque converter 22 is located at the front of the transmission 14 and is disposed within a bell housing 41 that is either attached to the transmission housing 40, or is an integral part of the housing. The torque converter 22 includes the impeller 26 that is coupled to the crankshaft of the engine 12. The torque converter 22 also includes the turbine 28 that is connected to a turbine shaft 43. The turbine shaft 43 drives the gear box that includes one or more planetary gear sets and an arrangement of clutches controlled by a valve body. A stator 51 is disposed between the impeller 26 and the turbine 28.

A drive gear 44 includes a first set of gear teeth 45 and is rotationally fixed on (or driven by) an input shaft 42 wherein the input shaft 42 may be powered by the engine. The drive gear 44 is configured for powering at least the transmission pump 32. An idler gear 46 is supported on an idler shaft 48 that is supported by the transmission housing 40. The idler gear 46 is a polymeric gear which has a relatively lower weight compared to traditional metal gears and further reduces whining noise in the gear train. A bearing 50 may be disposed between an inside bore of the polymeric gear 46 and the outer surface of the shaft 48. The bearing 50 directly engages with the polymeric outer ring 78 (with gear teeth 52) as further described herein. The polymeric gear teeth 52 of the idler gear 46 are in meshing engagement with the gear teeth 45 of the drive gear 44 in order to transmit power from the input drive shaft 42 to the pump gear (or driven gear) 56.

Referring back to FIG. 2, the transmission pump 32 may be an off-axis pump that is located at the lower-right side of the transmission 14. The transmission pump 32 includes a drive gear 56 fixed on a pump shaft 54 that powers the pump 32. The drive gear 56 has gear teeth 58 that are in meshing engagement with the gear teeth 52 of the idler gear 46 in order to transmit power from the idler gear 46 to the pump shaft 54. In an alternative embodiment, one or more additional idler gears may mesh between gear 46 and the pump drive gear 56 in order to transmit power to the pump shaft 54. As previously indicated, the idler gear 46 is piloted on a bearing 50 wherein the idler gear 46 is used to transfer torque between the drive gear 44 and the driven gear 56. The driven gear (transmission pump drive gear 56) is piloted on the pump shaft 54.

As shown in FIG. 2, the present disclosure provides a transmission which includes an input shaft 42, a drive gear 56, an idler gear 46, and a transmission pump gear 56. The drive gear 56 is fixed to the input shaft 42 which, in turn, may be powered by an engine 12. The idler gear 46 may include a second set of polymeric gear teeth 52 directly mounted to a bearing 50 as further described herein. The bearing 50 may be disposed on an idler shaft. The second set of polymeric gear teeth 52 in the idler gear 46 may be in meshing engagement with the first set of gear teeth 45. The transmission pump drive gear 56 may include a third set of gear teeth 58 in meshing engagement with the second set of polymeric gear teeth 52. The transmission pump drive gear 56 may be fixed to a pump shaft 54 of a transmission pump 32. The input shaft 42, the drive gear 44, the idler gear 46, and the transmission pump gear 56 are configured to power a transmission pump 32.

Figure 5:
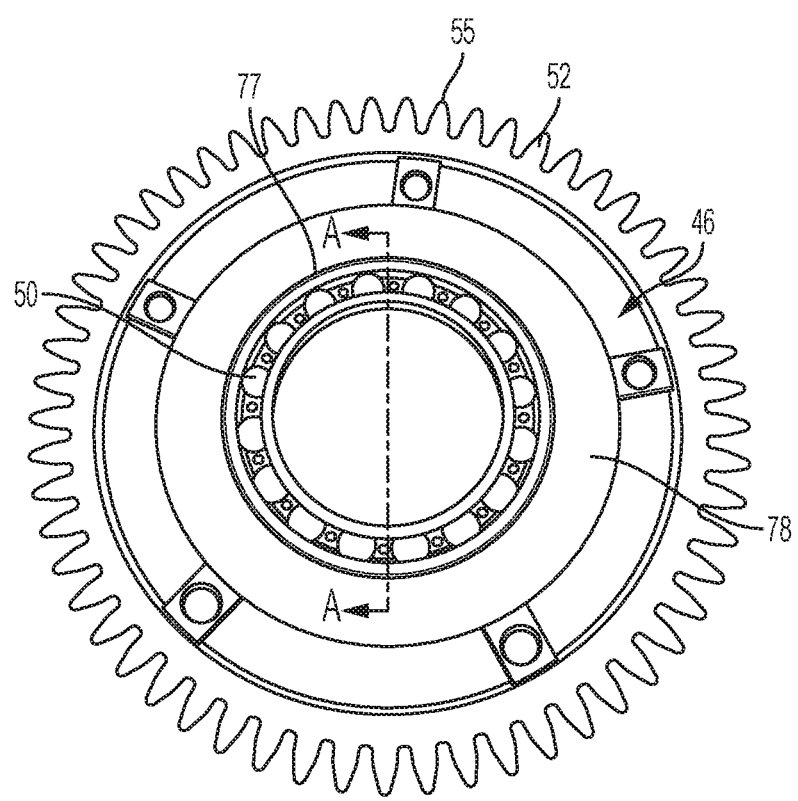
FIG. 5 is a front view of an example, non-limiting polymeric gear of the present disclosure.

With reference to FIGS. 5 to 6B, the aforementioned bearing 50 implemented in the aforementioned transmission may define a groove 60 (see FIG. 6A along an outer circumferential surface 62 (FIGS. 6A-6B) of the bearing 50. As shown, the groove 60 may, but not necessarily, be off-center relative to the width 64 of the bearing 50. As shown in FIG. 6A, the recess 76 (in the form of groove 60) may, but not necessarily, be off-center relative to a width 64 of the bearing 50 so as to provide sufficient structure to support the bearing balls 61 (or needle or roller—not shown) at the outer race 63 in the bearing. The inner race 70 of the bearing 50 for the polymeric gear 46 (FIGS. 6A-6B) is disposed on the idler shaft of the transmission 14 (FIG. 2). Referring now to FIG. 6B, the groove 60 may further define a groove depth 66 which varies along a full length 68 of the groove 60. The aforementioned groove 60 is configured to axially retain and circumferentially retain an inner circumferential surface 77 of the second set of (polymeric) gear teeth 52. It is understood that the second set of polymeric gear teeth 52 may, but not necessarily, be over-molded onto the bearing 50. As shown in FIG. 4, the aforementioned gear train 53 having a polymeric gear 46 may be disposed within the transmission housing 40 such that the input shaft 42 and the idler shaft each extend through a corresponding aperture in the housing 40.

Figure 7:
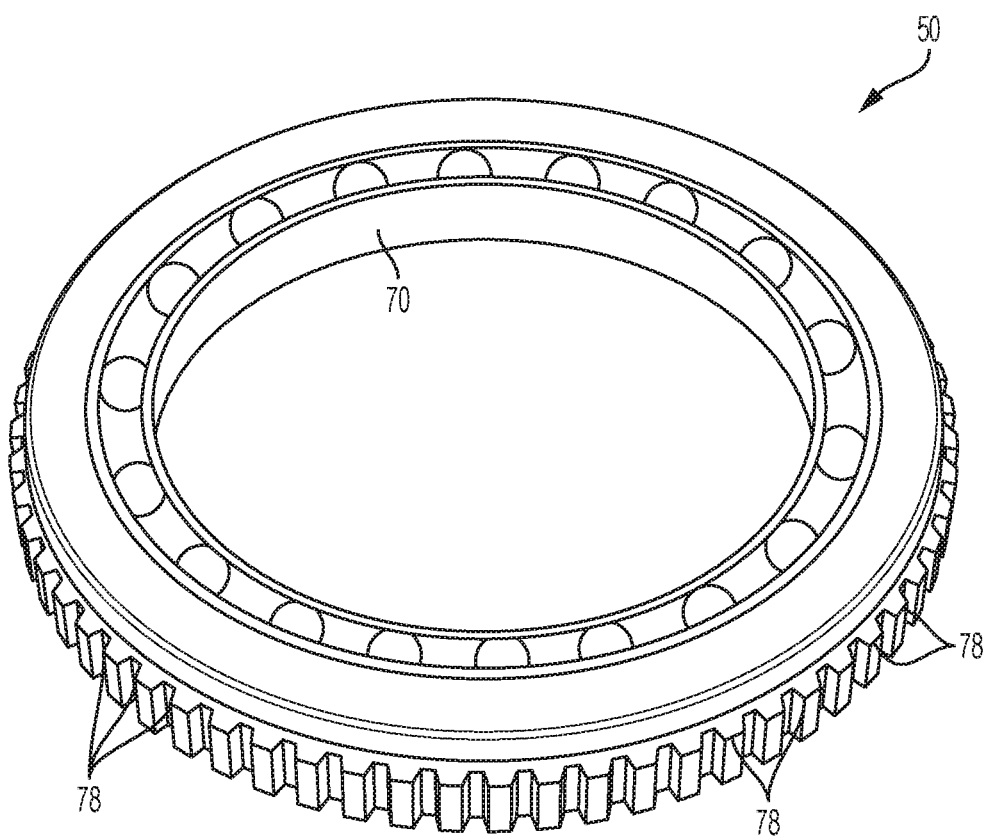
FIG. 7 is an isometric view of another example bearing used in the polymeric gear of FIG. 5 wherein the bearing defines a plurality of recesses.

In yet another embodiment of the present disclosure, a polymeric gear 46 is provided which includes a bearing 50 and a polymeric outer ring 78 mounted on the bearing 50. The bearing 50 may, but not necessarily, be a ball bearing 88. The bearing 50 may further define a recess 76 in an outer circumferential surface 62 of the bearing 50. The outer ring 78 may define an inner circumferential surface 77 and an outer surface 55 wherein the outer surface 55 further defines a plurality of polymeric gear teeth 52 along the outer surface 55. The recess 76 in the bearing 50 may be configured to retain at least a portion 79 of the inner circumferential surface 77 of the polymeric outer ring 78. The recess 76 in the bearing 50 may be configured in a variety of ways such as, but not limited to a continuous groove 60 along an outer circumferential surface 62 of the bearing 50. As shown in FIG. 6A, the recess 76 (in the form of groove 60) may, but not necessarily, be off-center relative to a width 64 of the bearing 50 so as to provide sufficient structure to support the balls 61 (or needle or roller—not shown) in the bearing. The continuous groove 60 may, but not necessarily, also define a depth 66 which varies along the outer surface 62 of the bearing 50 as shown in FIG. 6B. Referring again to FIG. 6A, the recess 76 in the form of a continuous groove 60 may, but not necessarily, define a base surface 82, a first side wall 84, and a second side wall 86. However, in one of many possible alternatives, the recess 76 may alternatively be configured as one of a plurality of recesses 78 defined along a circumference of the outer surface of the bearing 50 as shown in FIG. 7. Each recess 76 in the plurality of recesses 78 may be perpendicular to the front surface 80 of the bearing 50.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A polymeric gear comprising:
    a bearing defining a recess in an outer surface of the bearing; and
    an outer ring defining an inner circumference surface and an outer circumference surface, the outer circumference surface further defining a plurality of polymeric gear teeth;
    wherein the recess is configured to retain the outer ring and engage with at least a portion of the inner circumference of the outer ring;
    wherein the recess is a continuous groove along the outer surface of the bearing which defines a depth varying along a circumferential length of the outer surface of the bearing from a singular maximum depth to a singular minimum depth disposed along the circumferential length and circumferentially opposite the singular maximum depth, and wherein the recess is off-center relative to a width of the bearing,
    wherein the recess is one of a plurality of recesses defined along the circumferential length of the outer surface of the bearing.

2. The polymeric gear as defined in claim 1 wherein the recess is a continuous groove along the outer surface of the bearing.

3. The polymeric gear as defined in claim 2 wherein the continuous groove defines a depth which varies along the circumference of the outer surface of the bearing.

4. The polymeric gear as defined in claim 1 wherein each recess in the plurality of recesses is perpendicular to a front surface of the bearing.

5. The polymeric gear as defined in claim 3 wherein the recess is off-center relative to a width of the bearing.

6. The polymeric gear as defined in claim 5 wherein the recess defines a base surface, a first side wall, and a second side wall.

7. The polymeric gear as defined in claim 4 wherein the bearing is a ball bearing.

8. The polymeric gear as defined in claim 6 wherein the bearing is a ball bearing.

9. A polymeric gear comprising:
    a bearing defining a recess in an outer surface of the bearing; and
    an outer ring defining an inner circumference surface and an outer circumference surface, the outer circumference surface further defining a plurality of polymeric gear teeth;
    wherein the recess is configured to retain the outer ring and engage with at least a portion of the inner circumference of the outer ring, wherein the recess is a continuous groove along the outer surface of the bearing which defines a depth varying along a circumferential length of the outer surface of the bearing from a singular maximum depth continuously reducing to a singular minimum depth disposed along the circumferential length and circumferentially opposite the singular maximum depth, and wherein the recess is off-center relative to a width of the bearing.

10. The polymeric gear as defined in claim 9 wherein the recess defines a base surface, a first side wall, and a second side wall.

11. The polymeric gear as defined in claim 10 wherein the base surface is substantially perpendicular to the first side wall and the second side wall.

12. The polymeric gear as defined in claim 11 wherein the bearing is a ball bearing.

* * * * *